(12) United States Patent  (10) Patent No.: US 8,338,014 B2
Ng  (45) Date of Patent: Dec. 25, 2012

(54) BATTERY COVER LATCH MECHANISM AND PORTABLE ELECTRONIC DEVICE USING SAME

(75) Inventor: Lee-Han Ng, Shenzhen (CN)

(73) Assignee: FIH (Hong Kong) Limited, Kowloon (HK)

( * ) Notice: Subject to any disclaimer, the term of this patent is extended or adjusted under 35 U.S.C. 154(b) by 621 days.

(21) Appl. No.: 12/488,724

(22) Filed: Jun. 22, 2009

(65) Prior Publication Data
US 2010/0055551 A1 Mar. 4, 2010

(30) Foreign Application Priority Data
Aug. 29, 2008 (CN) .......................... 2008 1 0304287

(51) Int. Cl.
H01M 2/10 (2006.01)
H05K 7/00 (2006.01)
H05K 5/00 (2006.01)
G06F 1/16 (2006.01)

(52) U.S. Cl. ......... 429/97; 429/96; 429/100; 455/575.1; 361/679.56; 361/747

(58) Field of Classification Search .................... 429/96, 429/97, 100; 455/575.1; 361/679.56, 747
See application file for complete search history.

(56) References Cited

U.S. PATENT DOCUMENTS
2006/0166083 A1* 7/2006 Zhang et al. .................... 429/97
2006/0205269 A1* 9/2006 Li et al. .......................... 439/500
* cited by examiner Primary Examiner — Basia Ridley
Assistant Examiner — Jonathan G Leong
(74) Attorney, Agent, or Firm — Altis Law Group, Inc.

(57) ABSTRACT

A battery cover latch mechanism used to releasably latching a battery cover to a housing, the battery cover latch mechanism includes a button comprising latching part, an assembly portion disposed on the housing, the assembly portion defining a latching groove and a buttonhole for receiving the button therein, a clasp disposed on the battery cover, and configured for releasably latching with the latching part of the button; and a resilient member mounted on the button, the resilient member comprising two latching portions, the latching portions latched in the latching groove. The button is slidably mounted in the buttonhole of the assembly portion such that the latching part of the button releasably latches with the clasp under the resilient member. Also disclosed is a portable electronic device using the latching mechanism.

9 Claims, 7 Drawing Sheets

BATTERY COVER LATCH MECHANISM AND PORTABLE ELECTRONIC DEVICE USING SAME

BACKGROUND

1. Technical Field

The present disclosure relates to battery cover latch mechanisms used in portable electronic devices.

2. Description of Related Art

Portable electronic devices usually include latch mechanisms to latch battery covers to housings. The latch mechanisms are used frequently due to installation and removal of batteries.

A typical latch mechanism includes a pair of hooks at one end of the battery cover and a locking pin protruding from the other end of the battery cover. The housing defines a pair of grooves and a locking hole. In assembly, the hooks are inserted into the grooves. The battery cover is pressed downwardly onto the housing until the locking pin is inserted into the locking hole. However, during disassembly, a large force may be needed to remove the battery cover from the housing, making it difficult to install and remove batteries. Other latch mechanisms may include a metal ejector. However, the latch mechanism is positioned near an antenna of the portable electronic device and may interfere with radio-frequency (RF) performance of the antenna.

Therefore, there is a room for improvement within the art.

BRIEF DESCRIPTION OF THE DRAWINGS

Many aspects of a battery cover latch mechanism and a portable electronic device using the battery cover latch mechanism can be better understood with reference to the following drawings. The components in the drawings are not necessarily to scale, the emphasis instead being placed upon clearly illustrating the principles of the present battery cover latch mechanism and a portable electronic device using the battery cover latch mechanism. Moreover, in the drawings, like reference numerals designate corresponding parts throughout the several views.

DETAILED DESCRIPTION OF THE EMBODIMENTS

Figure 1:
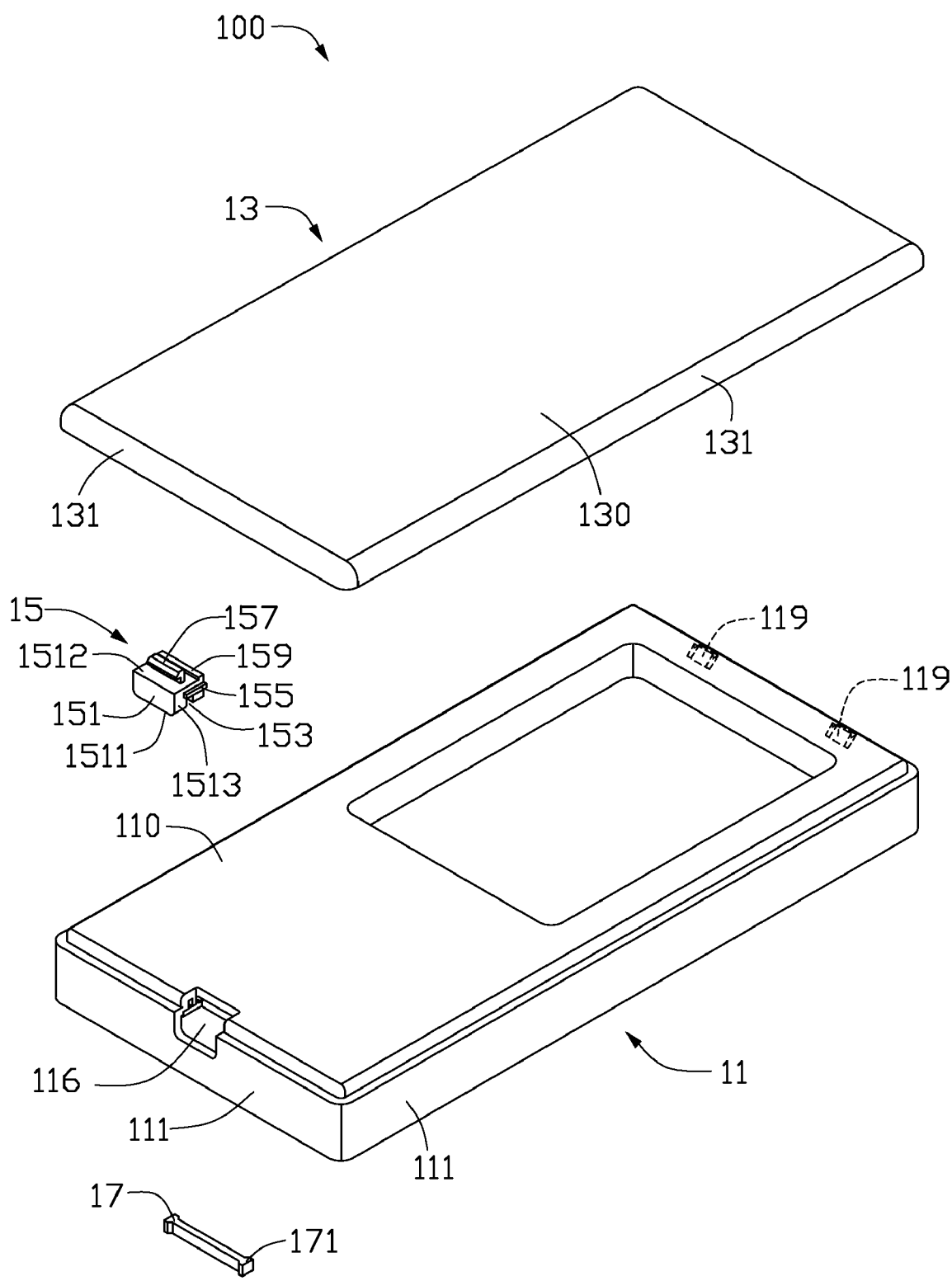
FIG. 1 is an exploded perspective view of a portable electronic device using a battery cover latching mechanism according to an exemplary embodiment.
Figure 2:
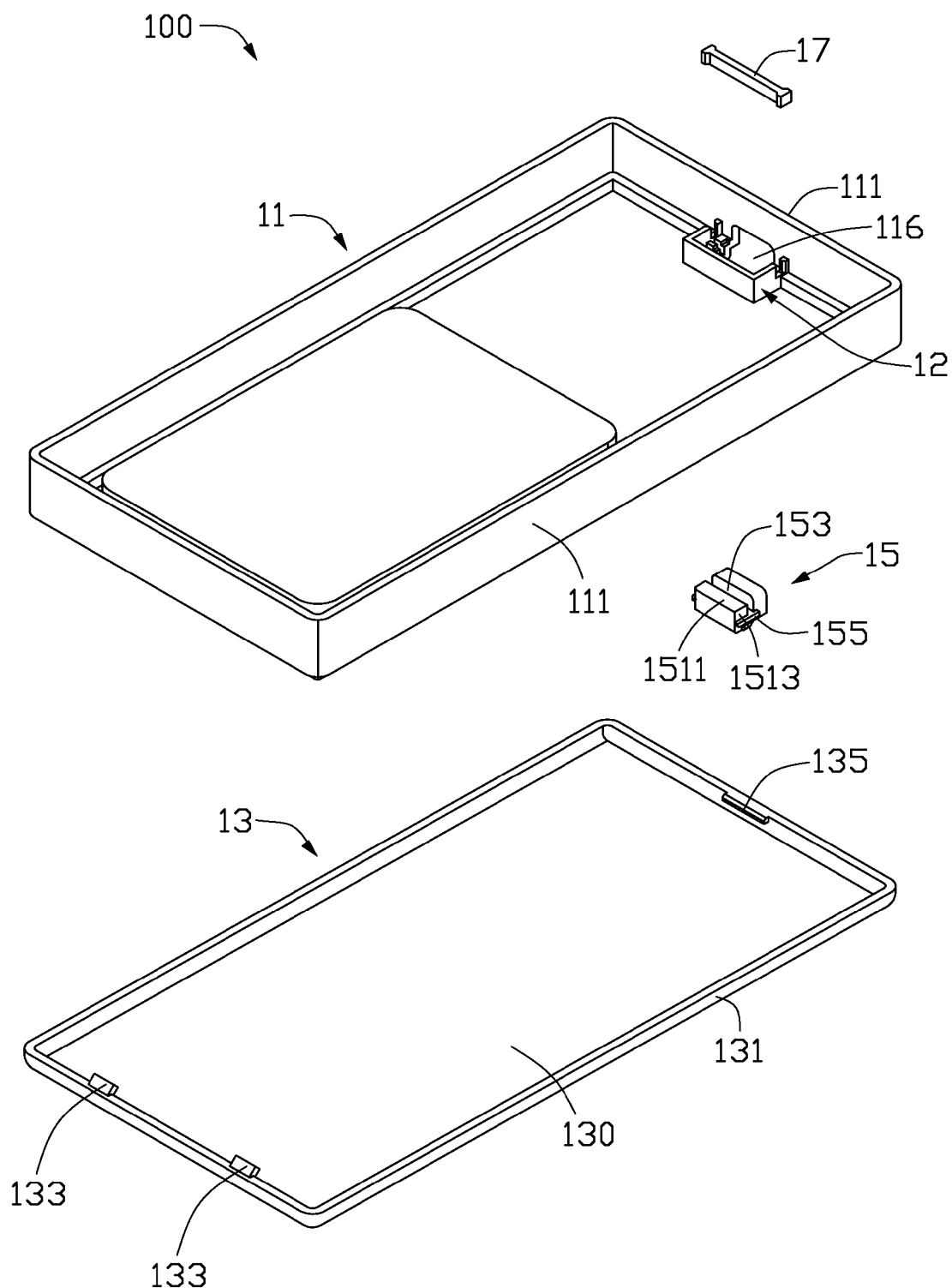
FIG. 2 is similar to FIG. 1, but viewed from anther angle.
Figure 3:
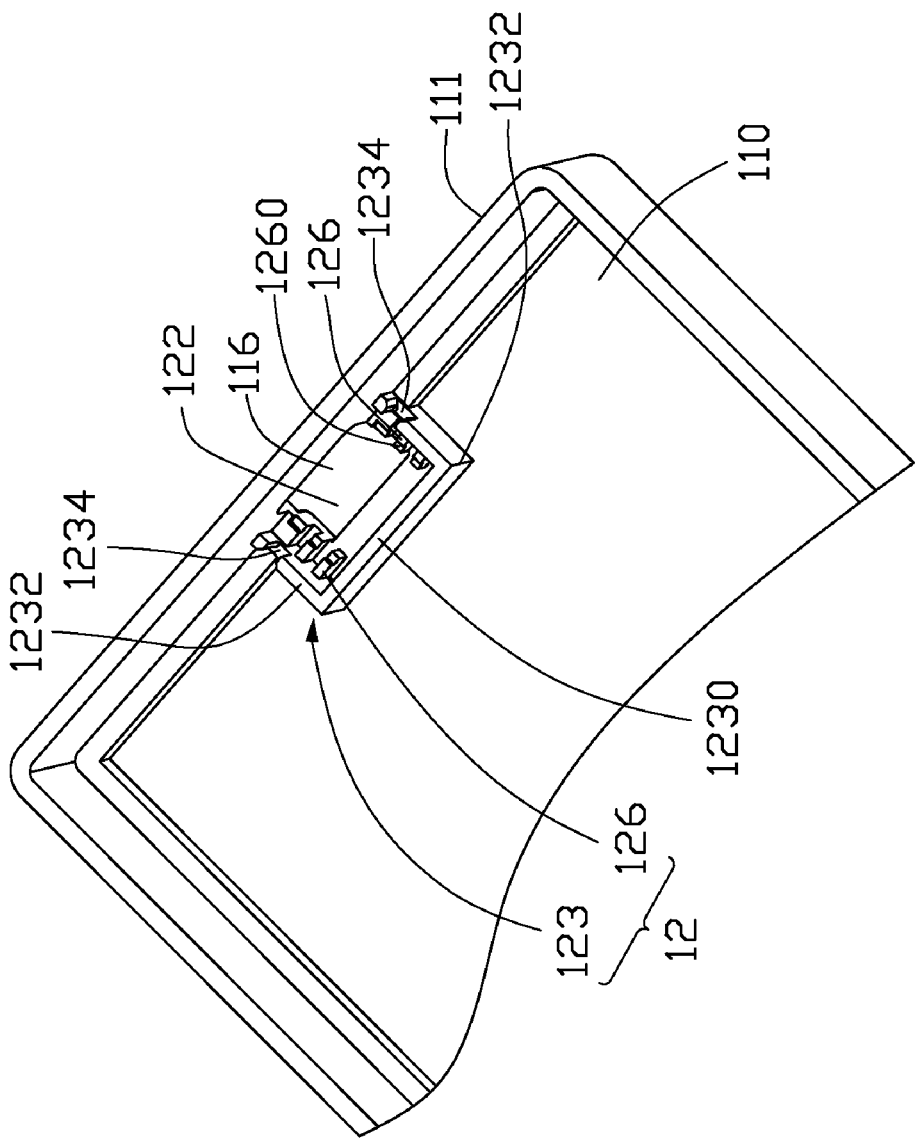
FIG. 3 is an enlarged partial view of FIG. 2.

Referring to the drawings, FIG. 1 to FIG. 3 show a portable electronic device using a battery cover latch mechanism 100. The battery cover latch mechanism 100 includes a housing 11, a battery cover 13 matable with the housing 11, an assembly part 12 positioned on the housing 11, a button 15, and a resilient member 17.

The housing 11 includes a main body 110 and four peripheral walls 111. The main body 110 includes two latching slots 119 and a buttonhole 116. The latching slots 119 are defined in one of the peripheral walls 111. The buttonhole 116 is a through hole defined in one of the peripheral walls 111 opposite to the latching slots 119.

The assembly part 12 includes an assembly portion 123 and a plurality of latching blocks 126 positioned on the main body 110. The assembly portion 123 includes an end wall portion 1230 facing one of the peripheral walls 111 defining the buttonhole 116 and two sidewall portions 1232 facing each other. The sidewall portions 1232 connect the end wall portion 1230 to one of the peripheral walls 111 defining the buttonhole 116. One of the peripheral walls 111 defining the buttonhole 116 and the assembly portion 123 cooperatively define a receiving cavity 122 communicating with the buttonhole 116. The receiving cavity 122 is configured for receiving the button 15. The sidewall portions 1232 respectively define a latching groove 1234 adjacent to one of the peripheral walls 111 defining the buttonhole 116. The latching grooves 1234 align with each other, and are configured for latching the resilient member 17. The latching blocks 126 are symmetrically positioned at two sides of the buttonhole 116. An end of each of the latching blocks 126 is attached to the sidewall portions 1232. The other end of each of the latching blocks 126 defines a recessed portion 1260.

The battery cover 13 includes a main cover 130, four peripheral walls 131, two jaws 133, and a clasp 135. The jaws 133 are positioned on one of the peripheral walls 131, and configured for latching in the latching slots 119. The clasp 135 is positioned on one of the peripheral walls 131 opposite to the jaws 133. The clasp 135 is an elastic part configured for latching the button 15.

The button 15 includes a button body 151, a receiving slot 153, two latching rods 155, a latching part 157, and a rib 159. The button body 151 includes a first end portion 1511, a second end portion 1512 opposite to the first end portion 1511, and two side portions 1513 opposite to each other. The side portions 1513 connect the first end portion 1511 to the second end portion 1512. The receiving slot 153 is defined in the first end portion 1511 and configured for receiving the resilient member 17. The latching rods 155 are respectively positioned on the side portions 1513 perpendicular to the receiving slot 153. The latching part 157 is positioned on the second end portion 1512 and configured for latching to the clasp 135. The rib 159 is positioned on a peripheral edge of the second end portion 1512.

The resilient member 17 can be made of rubber or similar material and includes two latching portions 171 respectively extending from two ends thereof. The resilient member 17 is configured for being received in the receiving slot 153 and resisting the button 15. The latching portions 171 are configured for respectively latching in the latching grooves 1234 and securing the resilient member 17 to the sidewall portions 1232.

Figure 4:
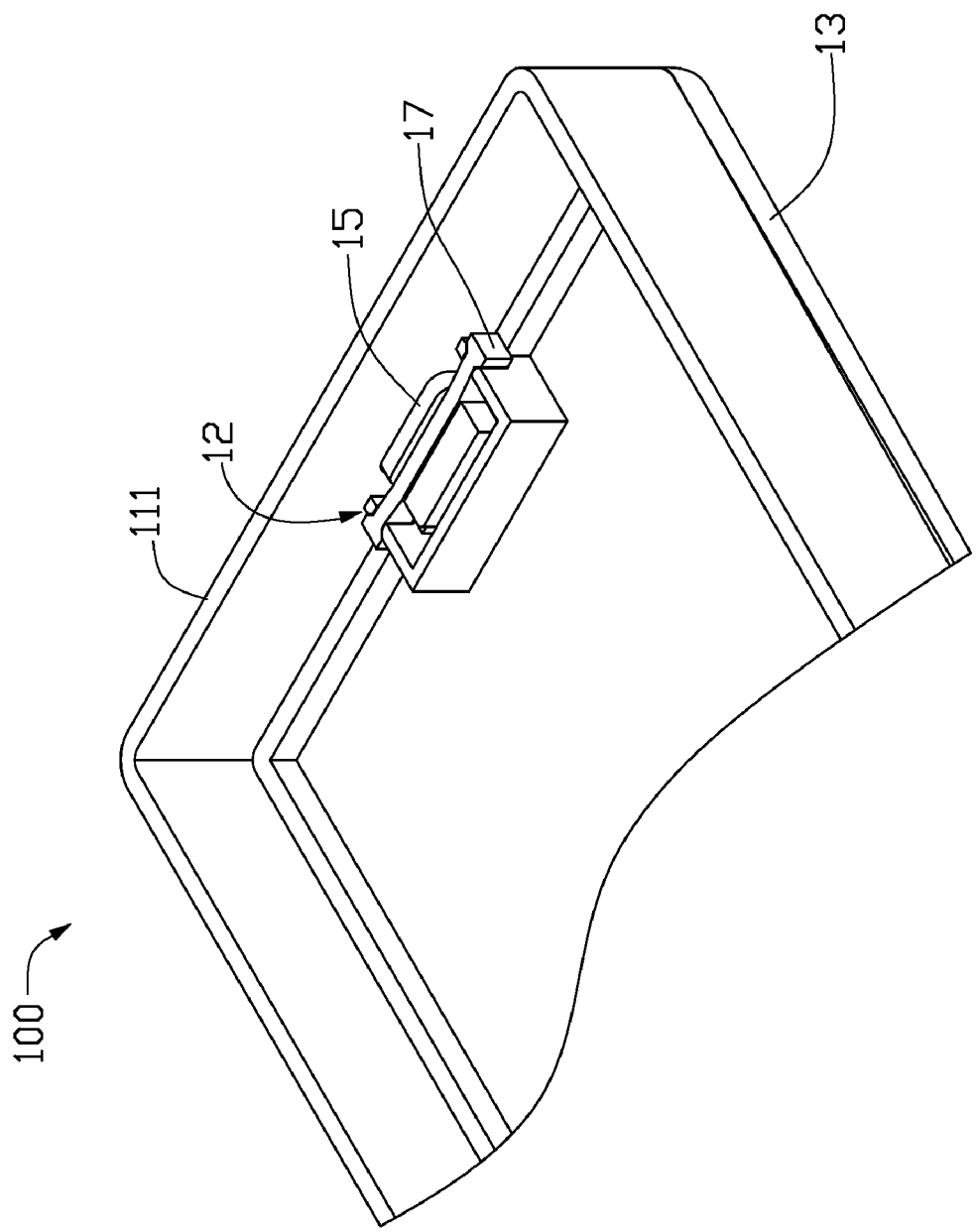
FIG. 4 is an assembled perspective partial view of the portable electronic device using the battery cover latching mechanism.
Figure 5:
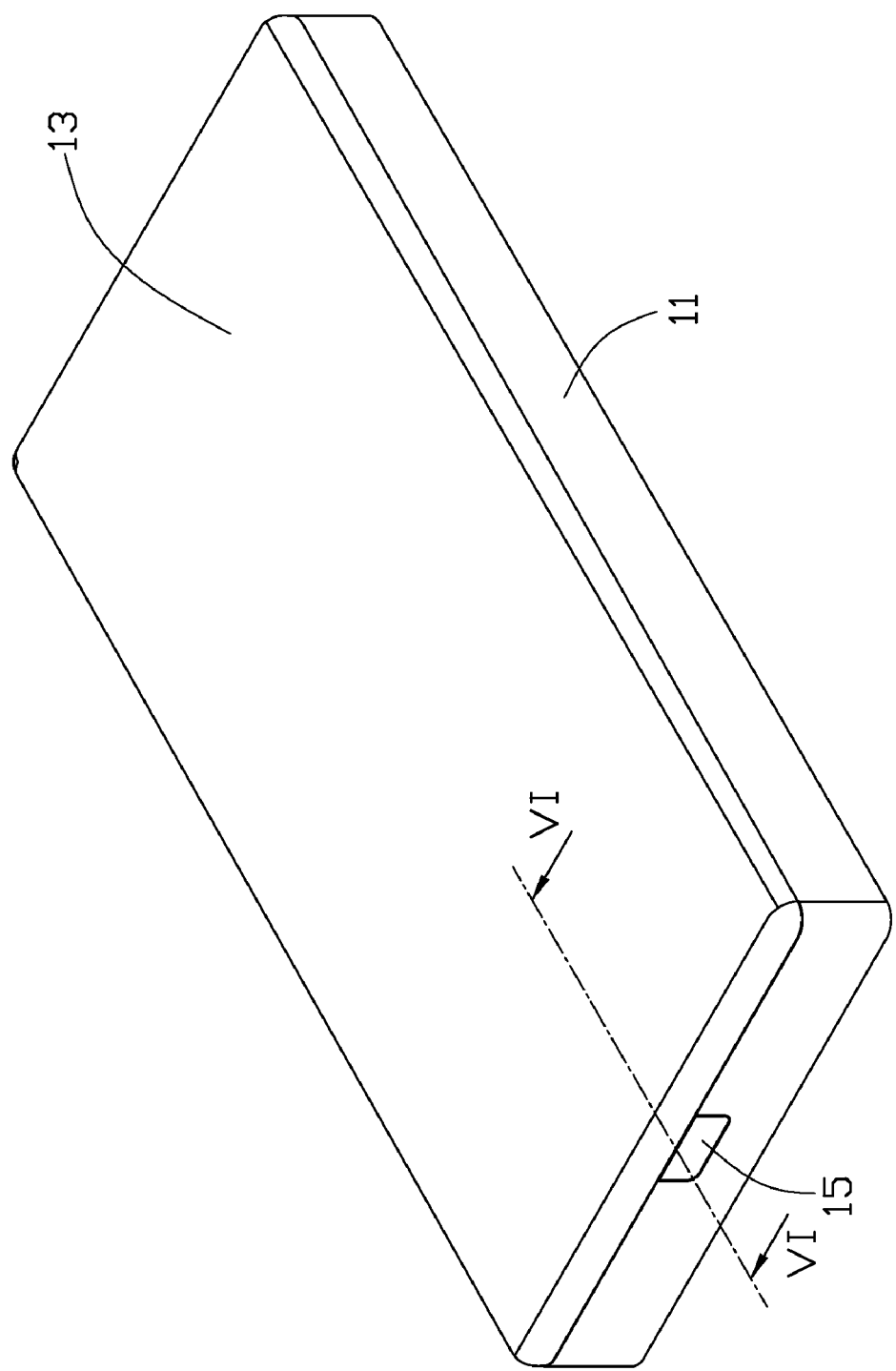
FIG. 5 is an assembled perspective view of the portable electronic device using the battery cover latching mechanism.
Figure 6:
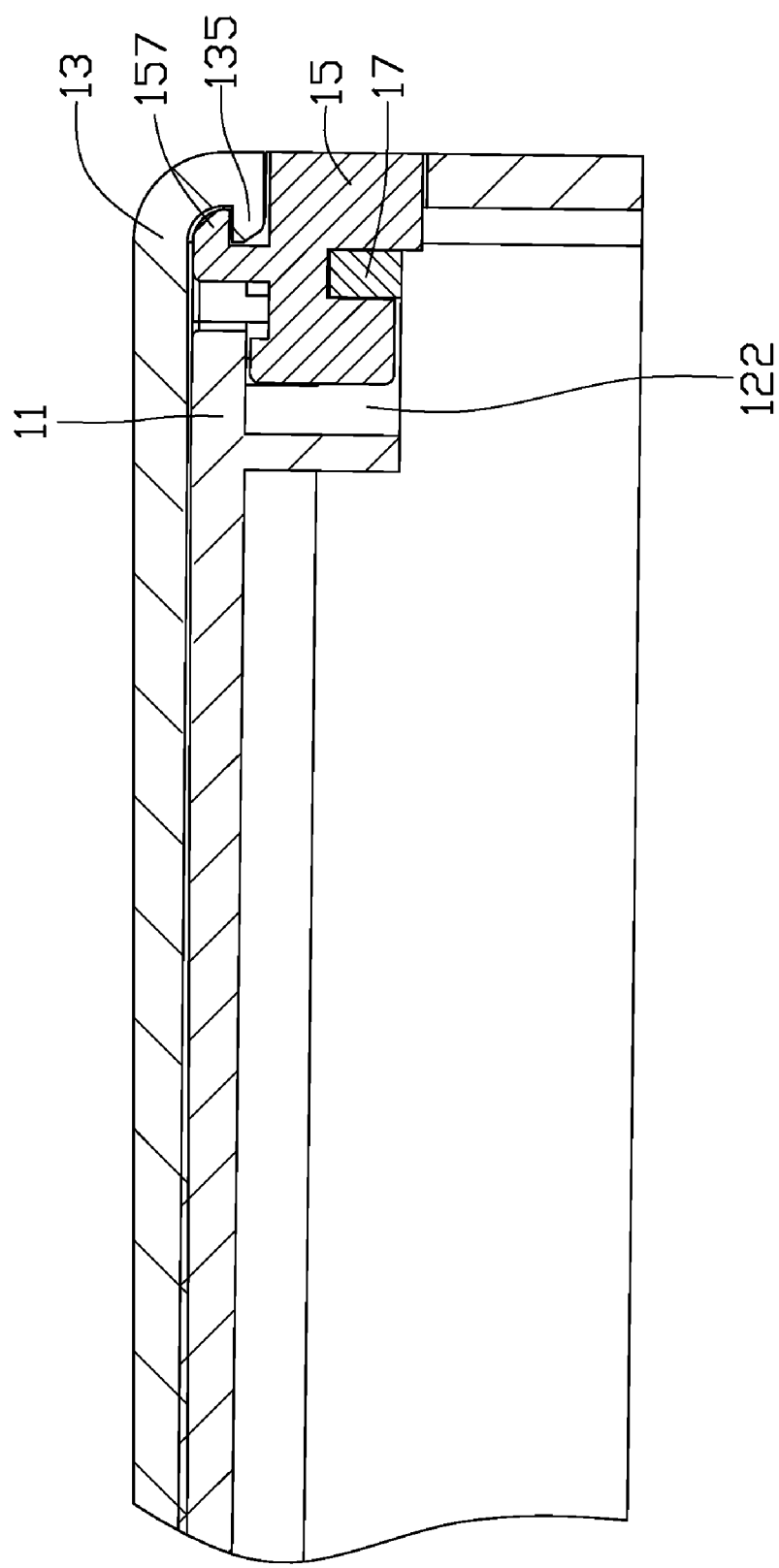
FIG. 6 is a cross-sectional view taken along line VI-VI of FIG. 5, showing the battery cover latching mechanism in a locked condition.

Referring to the drawings, FIG. 4 to FIG. 6, in assembly, the button 15 is placed in the receiving cavity 122. The latching rods 155 are respectively slidably received in the recessed portions 1260. The latching part 157 is exposed from the buttonhole 116. The rib 159 latches the main body 110 to prevent the button 15 from separating from the housing 11. The resilient member 17 is placed in the receiving slot 153. The latching portions 171 respectively latch in the latching grooves 1234. The battery cover 13 covers the housing 11. The jaws 133 are respectively received in the latching slots 119. The clasp 135 latches to the latching part 157. Thereby, the battery cover is assembled on the housing 11.

Figure 7:
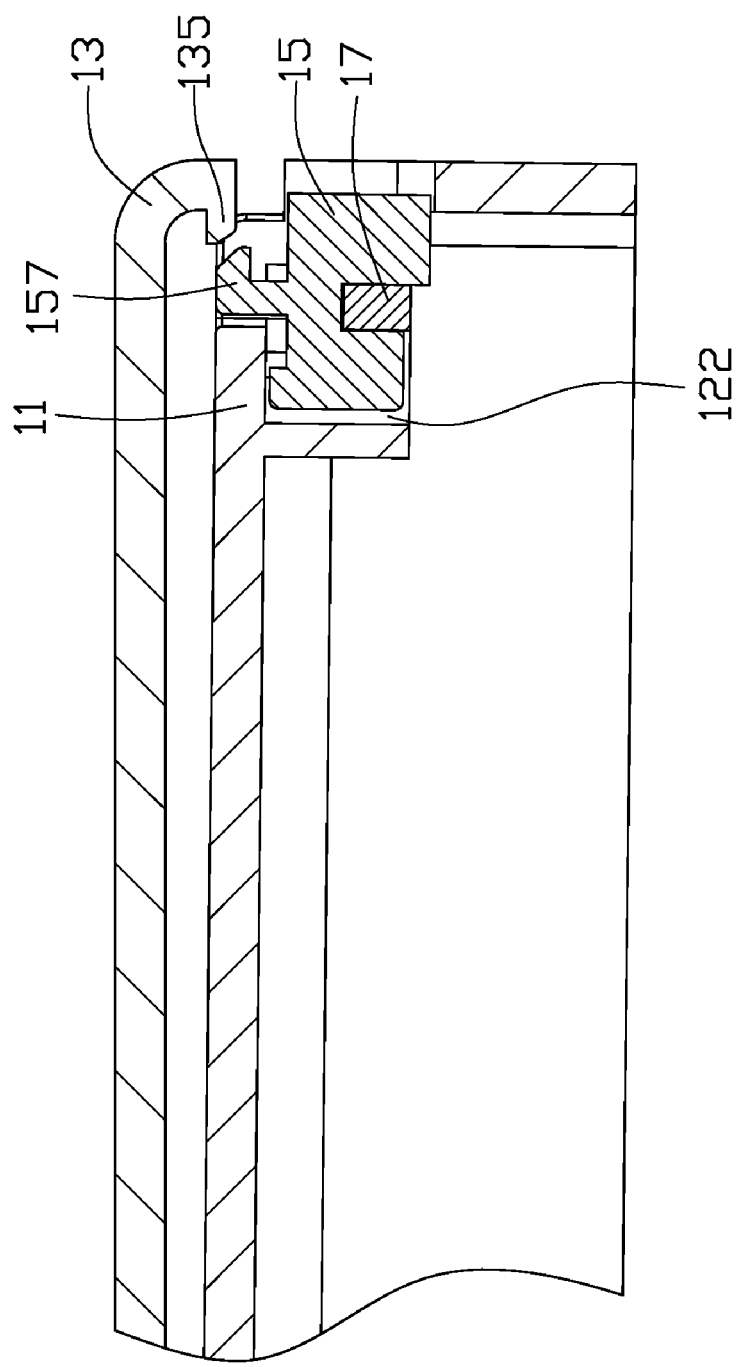
FIG. 7 is a cross-sectional view taken along line VI-VI of FIG. 5, showing the battery cover latching mechanism in unlocked condition.

Referring to FIG. 7, to remove the battery cover from the housing, the button body 151 is pushed by an external force. The button 15 slides in the receiving cavity 122 and drives the resilient member 17 to move away from the buttonhole 116. The resilient member 17 generates an elastic force. The latching part 157 is detached from the clasp 135. The battery cover 13 is pushed away from the housing 11, thereby the jaws 133 are detached from the latching slots 119. Thus, the battery cover 13 can be detached from the housing 11. Meanwhile, the button 15 returns to its original state under the elastic force of the resilient member 17.

The battery cover latch mechanism 100 includes the resilient member 17 secured on the sidewall portions 1232 for providing the elastic force to the button 15. The resilient member 17 is made of rubber or similar material and will not interfere with radio-frequency (RF) performance of the antenna.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism for releasably latching a battery cover to a housing, comprising:
   a button comprising a latching part, the button defining a receiving slot opposite to the latching part;
   an assembly portion disposed on the housing, the assembly portion defining a latching groove and a buttonhole for receiving the button therein;
   a clasp disposed on the battery cover, and configured for releasably latching with the latching part; and
   a resilient member received in the receiving slot and resisting the button, the resilient member comprising two latching portions, the latching portions latched in the latching groove;
   wherein the button is slidably mounted in the buttonhole of the assembly portion so the latching part releasably latches with the clasp under the resilient member.

2. The battery cover latch mechanism as claimed in claim 1, wherein the resilient member is made of rubber and the two latching portions respectively extend from two ends thereof.

3. The battery cover latch mechanism as claimed in claim 2, wherein the assembly portion comprises an end wall portion and two sidewall portions facing each other, each of the sidewall portions defines the latching groove.

4. The battery cover latch mechanism as claimed in claim 3, wherein the button further comprises a button body including a first end portion, a second end portion opposite to the first end portion, and two side portions opposite to each other, the receiving slot is defined in the first end portion, the latching part is positioned on the second end portion.

5. The battery cover latch mechanism as claimed in claim 4, wherein the assembly portion further comprises a plurality of latching blocks symmetrically positioned at two sides of the buttonhole, an end of each latching block is attached to the sidewall portions, the other end of each latching block defines a recessed portion.

6. The battery cover latch mechanism as claimed in claim 5, wherein the portions are adjacent to the buttonhole, a latching rod is respectively positioned on each side portions perpendicular to the receiving slot, the latching rods being slidably assembled in the recessed portions.

7. The battery cover latch mechanism as claimed in claim 6, wherein the button further comprises a rib positioned on the second end portion, and is parallel to the latching part, the rib is exposed from the buttonhole and latches to the housing.

8. A battery cover latch mechanism for releasably latching a battery cover to a housing, comprising:
   a button comprising a latching part and two opposite latching rods;
   an assembly portion disposed on the housing, the assembly portion defining a latching groove and a buttonhole for receiving the button therein, the assembly portion comprising a plurality of latching blocks positioned at two sides of the buttonhole and formed symmetrically along two lines, an end of each latching block defining a recessed portion;
   a clasp disposed on the battery cover, and configured for releasably latching with the latching part; and
   a resilient member mounted on the button, the resilient member comprising two latching portions, the latching portions latched in the latching groove;
   wherein the two latching rods are respectively slidably received in the recessed portions, the resilient member is perpendicular to the two latching rods and provides an elastic force to the button;
   wherein the button further comprises a button body including a first end portion, a second end portion opposite to the first end portion, and two side portions opposite to each other, a receiving slot for receiving the resilient member is defined in the first end portion, the latching part is positioned on the second end portion.

9. The battery cover latch mechanism as claimed in claim 8, wherein the button further comprises a rib positioned on the second end portion, the rib is exposed from the buttonhole and latches to the housing.

* * * * *